(12) United States Patent
Cheng et al.

(10) Patent No.: US 11,753,795 B2
(45) Date of Patent: Sep. 12, 2023

(54) DEVICE FOR DETECTING ROTARY ANGLE AND EXCAVATOR

(71) Applicant: Baidu Online Network Technology (Beijing) Co., Ltd., Beijing (CN)

(72) Inventors: Xinjing Cheng, Beijing (CN); Ruigang Yang, Beijing (CN); Yajue Yang, Beijing (CN); Feixiang Lu, Beijing (CN); Hao Xu, Beijing (CN)

(73) Assignee: Baidu Online Network Technology (Bejing) Co., Ltd., Beijing (CN)

( * ) Notice: Subject to any disclaimer, the term of this patent is extended or adjusted under 35 U.S.C. 154(b) by 125 days.

(21) Appl. No.: 16/567,264

(22) Filed: Sep. 11, 2019

(65) Prior Publication Data
US 2020/0165800 A1 May 28, 2020

(30) Foreign Application Priority Data
Nov. 26, 2018 (CN) .......................... 201811417863.3

(51) Int. Cl.
| | |
|---|---|
| *E02F 9/12* | (2006.01) |
| *E02F 9/26* | (2006.01) |
| *E02F 9/20* | (2006.01) |
| *F16H 7/02* | (2006.01) |

(52) U.S. Cl.
CPC .............. *E02F 9/123* (2013.01); *E02F 9/202* (2013.01); *E02F 9/264* (2013.01); *F16H 7/023* (2013.01); *B60Y 2200/412* (2013.01); *F16C 2361/61* (2013.01)

(58) Field of Classification Search
CPC . E02F 9/123; E02F 9/202; E02F 9/264; E02F 9/12; E02F 9/00; E02F 9/20; E02F 9/26; F16H 7/023; F16C 2361/61; B60Y 2200/412
See application file for complete search history.

(56) References Cited

U.S. PATENT DOCUMENTS

| | | | | |
|---|---|---|---|---|
| 2012/0097460 | A1* | 4/2012 | Owada | F04B 23/06 |
| | | | | 180/6.58 |
| 2015/0098786 | A1* | 4/2015 | Subrt | G01D 5/12 |
| | | | | 414/697 |

FOREIGN PATENT DOCUMENTS

| | | | | | |
|---|---|---|---|---|---|
| CN | 105463960 | A | * | 4/2016 | ............. E01B 31/17 |
| CN | 107237605 | A | * | 10/2017 | |
| CN | 108060693 | A | * | 5/2018 | |
| CN | 108060693 | A | | 5/2018 | |
| CN | 108332704 | A | | 7/2018 | |

(Continued)

OTHER PUBLICATIONS

English translation of Zeng (CN-107237605) (Year: 2017).*
English translation of Li et al. (CN-105463960-A) (Year: 2016).*

*Primary Examiner* — James M McPherson
*Assistant Examiner* — Kyle J Kingsland
(74) *Attorney, Agent, or Firm* — Ice Miller LLP

(57) ABSTRACT

A device for detecting a rotary angle used for an excavator. The device can include: a synchronous belt, arranged around a rotating shaft of a slewing mechanism of the excavator, a tooth-shaped surface of the synchronous belt being away from a surface of the rotating shaft; a transmission part, engaged with the tooth-shaped surface of the synchronous belt and arranged on a supporting base; an angle detection part, in transmission connection to the transmission part; and the supporting base, connected to a chassis of the excavator.

13 Claims, 2 Drawing Sheets

(56) References Cited

FOREIGN PATENT DOCUMENTS

| | | | | |
|---|---|---|---|---|
| CN | 108797669 | A | * | 11/2018 |
| CN | 209468801 | U | | 10/2019 |
| JP | 04358925 | A | * | 5/1991 |
| KR | 20140124493 | A | * | 10/2014 |

* cited by examiner

DEVICE FOR DETECTING ROTARY ANGLE AND EXCAVATOR

CROSS-REFERENCE TO RELATED APPLICATIONS

This application claims priority to Chinese Application No. 201811417863.3, filed on Nov. 26, 2018 and entitled "Device For Detecting Rotary Angle And Excavator," the entire disclosure of which is hereby incorporated by reference.

TECHNICAL FIELD

Embodiments of the present disclosure relate to the field of excavator technology, and specifically to a device for detecting a rotary angle and an excavator.

BACKGROUND

Excavator, also known as earth mover, is generally an earthmoving machine that excavates materials above or below the surface of a carrier and load the materials into a transport vehicle or unload the materials to a stockyard with a bucket. With the rapid development of construction machinery and the requirement of the actual working environment, excavators are gradually developing towards autonomous operation.

In order to realize automatic excavation by the excavator, it is usually necessary to acquire some operating parameters of the excavator, such as the real-time rotary angle of a base (i.e., the rotary angle of an excavating arm in the horizontal direction), which requires the installation of a sensor at the base of the excavator. At present, the existing installation method often needs to disassemble the entire excavator so as to install a code disc on the rotating shaft of the chassis of the excavator. Sometimes, it is even necessary to modify and machine the existing parts of the excavator. It is also necessary to reassemble the excavator after loading the code disc.

SUMMARY

Embodiments of the present disclosure propose a device for detecting a rotary angle and an excavator.

In a first aspect, an embodiment of the present disclosure proposes a device for detecting a rotary angle, the device being used for an excavator and comprising: a synchronous belt, arranged around a rotating shaft of a slewing mechanism of the excavator, a tooth-shaped surface of the synchronous belt being away from a surface of the rotating shaft; a transmission part, engaged with the tooth-shaped surface of the synchronous belt and arranged on a supporting base; an angle detection part, in transmission connection to the transmission part; and the supporting base, connected to a chassis of the excavator.

In some embodiments, the transmission part comprises a first gear, and the first gear is engaged with the tooth-shaped surface of the synchronous belt.

In some embodiments, a first rotating shaft is disposed on the supporting base, and the first gear and the angle detection part are respectively installed on both ends of the first rotating shaft.

In some embodiments, a fixing part is sleeved on the first rotating shaft, and the fixing part is located between the first gear and the angle detection part and fixedly connected to the supporting base.

In some embodiments, the transmission part further comprises a second gear, and the second gear is engaged with the first gear; and a second rotating shaft is disposed on the supporting base, and the second gear and the angle detection part respectively are installed on both ends of the second rotating shaft.

In some embodiments, a transmission ratio of the synchronous belt to the transmission part is less than 1.

In some embodiments, the supporting base is detachably connected to the chassis of the excavator, and the detachable connection mode comprises at least one of: bolted connection, magnetic connection or buckle connection.

In a second aspect, an embodiment of the present disclosure proposes an excavator, the excavator being provided with the device for detecting a rotary angle according to any embodiment in the first aspect.

In some embodiments, the excavator is an autonomous excavator.

Embodiments of the present disclosure proposes the device for detecting a rotary angle and the excavator, and the device may comprise a synchronous belt, a transmission part, an angle detection part and a supporting base, wherein the synchronous belt may be arranged around a rotating shaft of a slewing mechanism of the excavator, and the tooth-shaped surface of the synchronous belt is away from the surface of the rotating shaft. That is to say, the synchronous belt is installed on the rotating shaft so that a tooth ring is formed on the surface of the rotating shaft. At this time, the transmission part may be installed on the supporting base and be engaged with the tooth-shaped surface of the synchronous belt. Meanwhile, the angle detection part may be in transmission connection to the transmission part to detect the rotary angle of the excavator. The supporting base may be connected to a chassis of the excavator so as to fixedly install the whole device on the excavator. The device in the structure above is convenient to install and debug. The rotary angle of an existing excavator may be detected without disassembling and assembling the excavator again, thereby achieving autonomous operation of the excavator.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

The principles and features of the present disclosure will be further detailed in combination with the accompanying drawings. It should be appreciated that the specific embodiments described herein are merely used for explaining the relevant disclosure, rather than limiting the present disclosure. In addition, it should be noted that, for the ease of description, only the parts related to the present disclosure are shown in the accompanying drawings.

It should also be noted that some embodiments in the present disclosure and some features in the disclosure may be combined with each other on a non-conflict basis. Features of the present disclosure will be described below in detail with reference to the accompanying drawings and in combination with embodiments.

Figure 1:
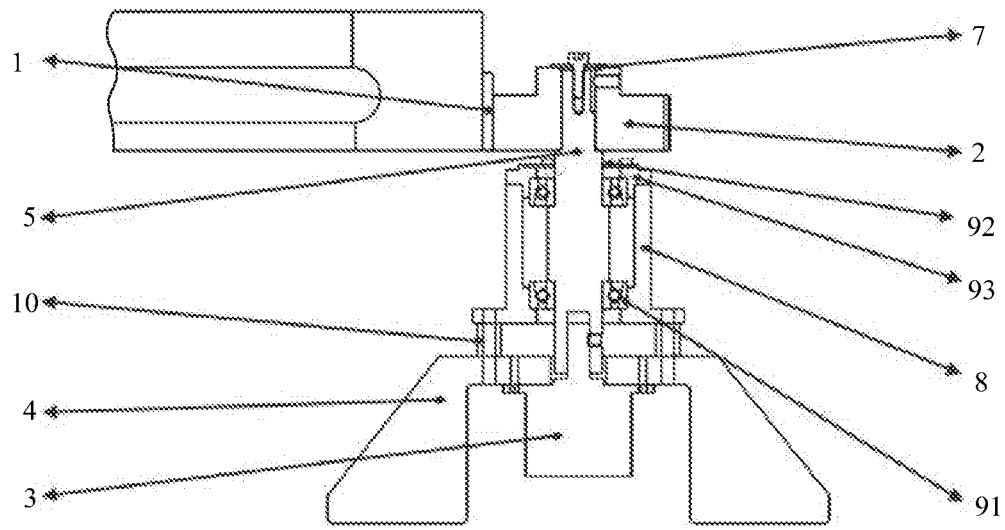
FIG. 1 is a sectional structural diagram of a device for detecting a rotary angle according to an embodiment of the present disclosure.

FIG. 1 is a sectional structural diagram of a device for detecting a rotary angle according to an embodiment of the present disclosure. The device may be used in a variety of excavators that need to detect the rotary angle thereof, such as and comprising (but not limited to) manned excavator and/or autonomous excavator. As shown in FIG. 1, the device 100 for detecting a rotary angle in some embodiments may comprise a synchronous belt 1, a transmission part 2, an angle detection part 3 and a supporting base 4.

In some embodiments, the synchronous belt is generally an annular belt using a steel wire rope or a glass fiber as a strong layer and covered with polyurethane or neoprene. The inner circumference of the synchronous belt is toothed to be engaged with a toothed belt pulley. As shown in FIG. 1, the synchronous belt 1 may be installed around the rotating shaft of the slewing mechanism of the excavator, and the tooth-shaped surface of the synchronous belt 1 may be away from the surface of the rotating shaft. That is, a tooth ring may be formed on the surface of the rotating shaft by making the inner circumference of the synchronous belt 1 face outwards and by surrounding the surface of the rotating shaft. The slewing mechanism may be used to drive the body of the excavator and an excavating arm thereof to rotate, thereby performing excavation.

In some embodiments, the model, width, and length of the synchronous belt 1 may be selected according to actual conditions. Moreover, the manner in which the synchronous belt 1 and the rotating shaft are installed is not limited in the present disclosure. For example, adhesive may be used for fixing for ease of installation.

In some embodiments, the transmission part 2 may be engaged with the tooth-shaped surface of the synchronous belt 1 so as to transmit the rotary angle of the rotating shaft. Meanwhile, the angle detection part 3 may be in transmission connection to the transmission part 2 to detect the rotary angle of the rotating shaft. Here, the structure of the transmission part 2 and the transmission connection thereof to the angle detection part 3 are not limited in the present disclosure. For example, the transmission connection may comprise (but not limited to) a transmission shaft or a transmission gear. Furthermore, the angle detection part 3, such as angle sensors with different detection precision or detection principles, may be selected according to the actual detection requirements.

In some embodiments, the transmission part 2 may be installed on the supporting base 4. At the same time, the supporting base 4 may be connected to the chassis of the excavator. That is, the device for detecting a rotary angle in some embodiments may be installed outside the excavator by means of the supporting base 4 without requiring the disassembly and assembly of the excavator, which not only facilitates the installation and debugging, but also does not affect the performance of the excavator. The installation and connection methods here may be of various common mechanical connection methods.

It should be noted that the existing excavators usually require manual driving. An operator may operate an excavator according to his own expertise and experience, and often does not need to detect the rotary angle of the excavating arm. However, in some practical application scenarios, an autonomous excavator is required taking into account the personal safety of the operator due to the particularity of the environment, that is, the excavator may achieve autonomous driving. The rotary angle of the excavating arm is generally one of the detection parameters of the autonomous excavator. It is known from the Background that the existing detection method usually involves installing a code disc on the rotating shaft of the chassis. Such method of installation requires the disassembly of the excavator. The installation process is complicated, a lot of manpower and resources will be consumed, and it is not easy to repair and debug after the installation. In addition, such method of installation has an impact on the performance of the excavator itself.

For the device for detecting a rotary angle according to some embodiments, the synchronous belt is arranged around the rotating shaft of the slewing mechanism of the excavator. The tooth-shaped surface of the synchronous belt is away from the surface of the rotating shaft, so that a tooth ring may be formed on the surface of the rotating shaft. At this time, the transmission part may be installed on the supporting base and be engaged with the tooth-shaped surface of the synchronous belt, so as to transmit the rotary angle. Meanwhile, the angle detection part may be in transmission connection to the transmission part to detect the rotary angle of the excavator. The supporting base may be connected to the chassis of the excavator so as to fixedly install the whole device on the excavator. The device in the structure above is convenient to install and debug. The rotary angle of an existing excavator may be detected without disassembling the excavator, thereby improving the operation accuracy, and achieving autonomous operation of the excavator.

In some alternative implementations of some embodiments, the transmission part 2 may comprise a gear, i.e. a first gear. As shown in FIG. 1, the first gear may be engaged with the tooth-shaped surface of the synchronous belt 1. Here, the supporting base 4 may be provided with a first rotating shaft 5 thereon. At this time, the first gear and the angle detection part 3 may be respectively installed on both ends of the first rotating shaft 5. That is to say, the first gear and the angle detection part 3 may be in transmission connection by means of the first rotating shaft 5, which not only simplifies the structure of the device, but also helps to improve the accuracy of the rotary angle detection results.

As may be seen from FIG. 1, the first gear may be fixed to the upper end of the first rotating shaft 5 by means of a pin key, a cover plate 7, and a screw or the like. At the same time, the angle detection part 3 may be fixedly connected to the lower end of the first rotating shaft 5. The upper end here mainly refers to the end away from the ground. The upper and lower ends are usually opposite. Hence, as the rotating shaft of the slewing mechanism of the excavator rotates, the first gear engaged with the synchronous belt 1 on the rotating shaft also rotates. At the same time, the first gear also drives the first rotating shaft 5 to rotate. Therefore, the rotary angle of the first gear (first rotating shaft 5) may be detected by the angle detection part 3. Further, the rotary angle of the rotating shaft may be obtained according to the transmission ratio of the synchronous belt 1 to the first gear.

Here, in order to improve the installing rigidity of the first rotating shaft 5, a fixing part 8 may be sleeved on the first rotating shaft 5. As shown in FIG. 1, the fixing part 8 may be located between the first gear and the angle detection part 3. The fixing part 8 may be installed on the first rotating shaft 5 by means of a bearing 91, a bearing baffle 93, and a bearing cover plate 92, and is fixedly connected to the supporting base 4. Therefore, when the first gear and the first rotating shaft 5 are rotated, the device as a whole may be stably installed on the chassis of the excavator.

Furthermore, as shown in FIG. 1, the fixing part 8 and the supporting base 4 may be fixedly connected by means of a supporting sleeve 10 so as to facilitate the installation and maintenance of the device. Therefore, a gap may be left at the joint between the angle detection part 3 and the first rotating shaft 5, and an accommodation space for placing the angle detection part 3 is formed in the supporting base 4.

Figure 2:
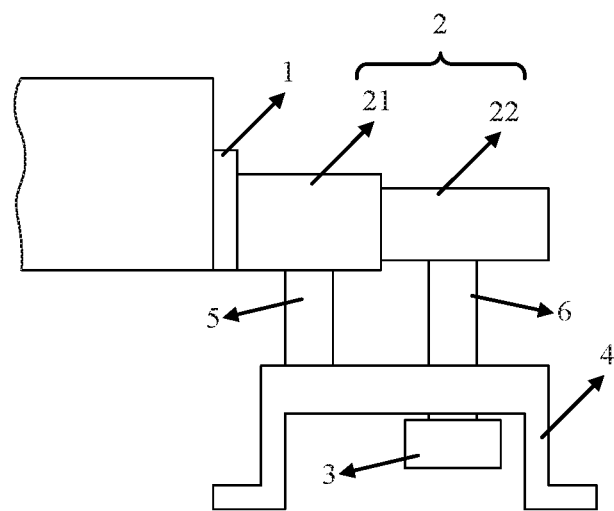
FIG. 2 is a schematic structural diagram of the device for detecting a rotary angle according to another embodiment of the present disclosure.

In some embodiments, as shown in FIG. 2, the transmission part 2 may comprise two gears, i.e., a first gear 21 and a second gear 22. The first gear 21 may be engaged with the synchronous belt 1, and the second gear 22 may be engaged with the first gear 21. At this time, a second rotating shaft 6 may be provided on the supporting base 4. The second gear 22 and the angle detection part 3 may be respectively installed on both ends of the second rotating shaft 6. Hence, when the rotating shaft of the slewing mechanism is rotated, the synchronous belt 1 may be engaged with the first gear 21 to rotate. At the same time, the second gear 22 may drive the second rotating shaft 6 to rotate with the first gear 21, thereby detecting the rotary angle of the second gear 22 (second rotating shaft 6) by means of the angle detection part 3. Hence, the rotary angle of the rotating shaft may be obtained according to the gear ratio of the synchronous belt 1 to the second gear 22, which may enrich the structure of the device so as to meet the needs of different users and expand the application scope thereof.

It should be noted that the transmission ratio of the synchronous belt 1 to the transmission part 2 may be less than one for the device in the embodiments above, for example, the transmission ratio of the synchronous belt 1 to the transmission part 2 may be 1:9. Hence, the transmission part 2 may still be rotated at a high speed in the case that the synchronous belt 1 (the rotating shaft of the swing mechanism) is rotated at a low speed, thereby facilitating the improvement of the detection accuracy of the angle detection part 3. Moreover, since the space between a body base of the excavator and the chassis is relatively small, a small-sized transmission part may be used for easy installation.

Furthermore, the device may be designed as a height-adjustable structure so as to increase the application scope of the device, so that the height of the transmission part may be adjusted to be applied to different types of excavators. For example, the height of the supporting base may be adjusted. For another example, the height of the support sleeve in the embodiment above may be adjusted. For another example, the axial position of the first gear on the first rotating shaft may be adjusted. In some application scenarios, the position where the synchronous belt is engaged with the first gear may also be adjusted. The position where the synchronous belt 1 is engaged with the first gear is merely illustrative in FIG. 1.

Further, a detachable connection may be made between the supporting base and the chassis of the excavator, which allows the device to be applied to different excavators, thus reducing the input costs. The detachable connection may comprise (but not limited to) at least one of: bolted connection, magnetic connection or buckle connection.

Optionally, in order to reduce or avoid the impact of the vibration of the excavator during operation on the detection result of the device, the device in some embodiments of the present disclosure may also be provided with a shock absorbing part. For example, the shock absorbing part may be provided at a contact surface between the supporting base and the chassis. The shock absorbing part herein may comprise (but not limited to) at least one of: rubber, silicone or fabric.

As may be seen from the description of the embodiments above, the device for detecting a rotary angle proposed by some embodiments of the present disclosure has a simple structure and a low production cost. In addition, the installation process is simple, which is beneficial to reduce the transformation cost of the excavator and improve the transformation efficiency. The device may contribute to the realization of a large number of autonomous excavators, thereby improving the working efficiency of the excavator and reducing the labor intensity of operators.

Also provided by an embodiment of the present disclosure is an excavator. The excavator may be provided with the device for detecting a rotary angle as described in the embodiments above. As an example, the structure of the excavator may be as shown in FIG. 3 which shows a partial structural diagram of the excavator according to an embodiment of the present disclosure.

Figure 3:
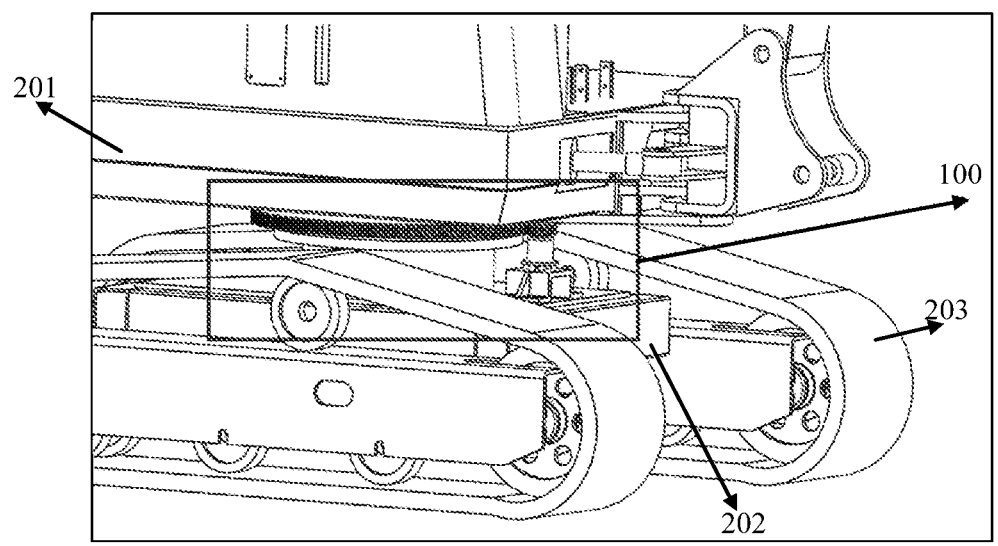
FIG. 3 is a partial schematic structural diagram of an excavator according to an embodiment of the present disclosure.

As shown in FIG. 3, the body 201 and the excavating arm of the excavator may be connected to the chassis 202 by means of the swing mechanism. Crawler belts 203 are installed on both sides of the chassis 202. The crawler belts 203 may drive the excavator to run back and forth. As may be seen from FIG. 3, the synchronous belt in the device 100 for detecting a rotary angle is installed around the surface of the rotating shaft. The transmission part and the angle detection part are installed on the chassis 202 by means of the supporting base. In this way, the rotary angle of the arm may be detected by the angle detection part, which helps to achieve automatic excavation by the excavator.

It may be understood that the excavator in some embodiments is not limited in the present disclosure, and the excavator may be an existing manned excavator or an autonomous excavator.

The excavator provided in some embodiments may effectively detect the rotary angle of the excavating arm by installing a device for detecting a rotary angle, which is not only beneficial to improve the operation accuracy of the excavator, but also contributes to the autonomous operation of the excavator. Moreover, it is not necessary to reassemble the excavator in the process of installing the device for detecting a rotary angle. The device is easy to install and has a low transformation cost, and does not affect the performance of the excavator.

The above description only provides an explanation of embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A device for detecting a rotary angle, the device being used for an excavator and comprising:
   a synchronous belt, arranged around a rotating shaft of a slewing mechanism of the excavator, a tooth-shaped surface of the synchronous belt being away from a surface of the rotating shaft;

a transmission part, engaged with the tooth-shaped surface of the synchronous belt and arranged on a supporting base, wherein the supporting base is detachably connected to the chassis of the excavator, height of the supporting base is adjustable, and the detachable connection comprises magnetic connection or buckle connection;

an angle detection part, in transmission connection to the transmission part;

the supporting base, connected to a chassis of the excavator; and a shock absorbing part, provided at a contact surface between the supporting base and the chassis.

2. The device according to claim 1, wherein the transmission part comprises a first gear, and the first gear is engaged with the tooth-shaped surface of the synchronous belt.

3. The device according to claim 2, wherein a first rotating shaft is disposed on the supporting base, axial position of the first gear on the first rotating shaft is adjustable, and the first gear and the angle detection part are respectively installed on opposite ends of the first rotating shaft.

4. The device according to claim 3, wherein a fixing part is sleeved on the first rotating shaft, and the fixing part is located between the first gear and the angle detection part and fixedly connected to the supporting base.

5. The device according to claim 1, wherein the transmission part further comprises a second gear, and the second gear is engaged with the first gear; and a second rotating shaft is disposed on the supporting base, and the second gear and the angle detection part are respectively installed on opposite ends of the second rotating shaft.

6. The device according to claim 1, wherein a transmission ratio of the synchronous belt to the transmission part is 1:9.

7. An excavator, the excavator being provided with a device for detecting a rotary angle, the device comprising:

a synchronous belt, arranged around a rotating shaft of a slewing mechanism of the excavator, a tooth-shaped surface of the synchronous belt being away from a surface of the rotating shaft;

a transmission part, engaged with the tooth-shaped surface of the synchronous belt and arranged on a supporting base, wherein the supporting base is detachably connected to the chassis of the excavator, height of the supporting base is adjustable, and the detachable connection comprises magnetic connection or buckle connection;

an angle detection part, in transmission connection to the transmission part;

the supporting base, connected to a chassis of the excavator; and a shock absorbing part, provided at a contact surface between the supporting base and the chassis.

8. The excavator according to claim 7, wherein the excavator is an autonomous excavator.

9. The excavator according to claim 7, wherein the transmission part comprises a first gear, and the first gear is engaged with the tooth-shaped surface of the synchronous belt.

10. The excavator according to claim 9, wherein a first rotating shaft is disposed on the supporting base, axial position of the first gear on the first rotating shaft is adjustable, and the first gear and the angle detection part are respectively installed on opposite ends of the first rotating shaft.

11. The excavator according to claim 10, wherein a fixing part is sleeved on the first rotating shaft, and the fixing part is located between the first gear and the angle detection part and fixedly connected to the supporting base.

12. The excavator according to claim 7, wherein the transmission part further comprises a second gear, and the second gear is engaged with the first gear; and a second rotating shaft is disposed on the supporting base, and the second gear and the angle detection part are respectively installed on opposite ends of the second rotating shaft.

13. The excavator according to claim 7, wherein a transmission ratio of the synchronous belt to the transmission part is 1:9.

* * * * *